United States Patent [19]

Neser

[11] 4,317,851

[45] Mar. 2, 1982

[54] METHOD FOR SPRAY APPLYING AN INSULATING COATING TO METALLIC OR NON-METALLIC OBJECTS

[75] Inventor: Rudolf P. Neser, Ludwigshafen am Rhein, Fed. Rep. of Germany

[73] Assignee: Woellner-Werke, Ludwigshafen am Rhein, Fed. Rep. of Germany

[21] Appl. No.: 77,767

[22] Filed: Sep. 21, 1979

[30] Foreign Application Priority Data

Sep. 25, 1978 [DE] Fed. Rep. of Germany ....... 2841624

[51] Int. Cl.[3] ......................... B05D 1/12; B05D 1/34; B05D 1/02

[52] U.S. Cl. .................................... 427/426; 427/427; 428/375

[58] Field of Search ............... 427/378, 426, 427, 196; 428/375, 920; 106/74, 84; 252/62

[56] References Cited

U.S. PATENT DOCUMENTS

| | | | |
|---|---|---|---|
| 2,683,625 | 7/1954 | Fisher | 427/426 |
| 2,756,159 | 7/1956 | Kendall | 106/84 |
| 3,002,857 | 10/1961 | Stalego | 106/84 X |
| 3,055,831 | 9/1962 | Barnett et al. | 252/62 |
| 3,272,675 | 9/1966 | Suzumura et al. | 106/84 X |
| 3,639,276 | 2/1972 | Mueller | 252/62 |
| 3,676,197 | 7/1972 | Harrison et al. | 427/426 X |
| 3,715,230 | 2/1973 | Sadler | 427/427 X |
| 3,839,079 | 10/1974 | Barnett | 106/84 X |
| 4,066,463 | 1/1978 | Chollet | 252/62 X |

FOREIGN PATENT DOCUMENTS

| | | | |
|---|---|---|---|
| 868247 | 10/1978 | Belgium . | |
| 2734839 | 2/1979 | Fed. Rep. of Germany . | |
| 991770 | 5/1965 | United Kingdom | 427/196 |
| 2001333 | 2/1979 | United Kingdom . | |

*Primary Examiner*—Shrive P. Beck
*Attorney, Agent, or Firm*—Browdy and Neimark

[57] ABSTRACT

A method for insulating an object with a protective coating under unfavorable conditions of, for example, high humidity, without separation or running of the binding material. The method provides for making a coating consisting of mineral fibers and a binder which includes one or more alkali silicates as well as one or more organic polymers for silicon dioxide. This binder and the mineral fibers are applied to the object together with a hardener for the binder, at the time of application to the object. The invention further describes an apparatus for simultaneous spray application of fibers, binder and hardener to the object to be protected.

12 Claims, 1 Drawing Figure

1

2

3

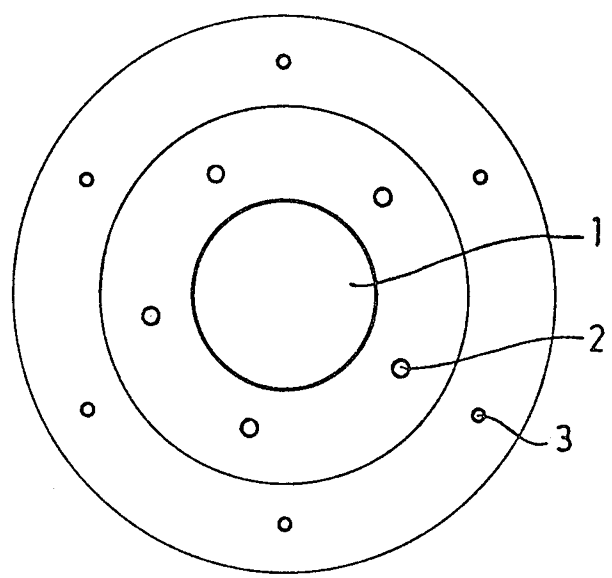
1
2
3

METHOD FOR SPRAY APPLYING AN INSULATING COATING TO METALLIC OR NON-METALLIC OBJECTS

FIELD OF THE INVENTION

The invention relates to a composition to be applied externally to metallic or non-metallic objects, in particular for protection against flame or fire.

DESCRIPTION OF THE PRIOR ART

The German laid-open application OS No. 27 34 839 describes an adhesive compound based on an alkali silicate solution for use in the application of sprayed mesh insulation. The adhesive compound described therein is characterized by a solution of one or more alkali silicates having a content of 1–10 weight % and in particular 2–6 weight % of one or more materials that contain more than 15% kaolinite. The adhesive further contains one or more water soluble but alkali resistant organic polymers and/or fine-grained silicon dioxide. The adhesive described in this document has high initial adherence to prevent the sprayed-on insulating layer from falling off. The adhesive is heat-resistant up to at least 1,000° C., does not drip or run out of the insulating coating and is capable of prolonged shelf life. Furthermore, the adhesive compound is non-corrosive and does in fact offer protection against metallic corrosion.

OBJECT AND SUMMARY OF THE INVENTION

It is a principal object of the present invention to provide an adhesive compound substantially as described above with the additional improvement of being capable of application in very humid atmospheres, for example as encountered in tropical climates, without any running or dripping from the insulating coating.

An associated object of the invention is to provide an apparatus for carrying out the method of the invention and applying the adhesive insulating layer compound in substantially thicker layers than has previously been possible.

These objects are attained according to the invention by adding a hardening substance to the mixture of fibers and binder during the spraying process. The apparatus of the invention provides for simultaneous application of fibers, binder and hardener.

The use of the hardener in the previously known adhesive compound was not obvious because the application of the hardener in the form of an aqueous solution and the admixture to the fibers and the binder would result in a relative thinning. Accordingly, one had to assume that such thinning would reduce the thixotropy of the overall mixture resulting in relatively inferior initial adhesion and a possible separation of the mixture of binder and hardener from the applied fibrous layer. It has been found unexpectedly and surprisingly that these disadvantages do not occur and that mixtures according to the invention can be applied in a single process to objects to be protected in layers which can be at least twice as thick as those possible when no hardener is used. Furthermore, the hardening times are reduced to one-tenth of the times required when a mixture without a hardener is used. Nevertheless, all advantages described in the publication OS No. 27 34 839 are retained.

A further substantial advantage of the invention is that sprayed-on insulation can be applied even in extremely humid climates, for example tropical climates. Under such conditions, the application of a compound without hardener would cause a separation of the binder from the insulating coating even if experienced personnel were used for the application of the insulation. This disadvantage is completely removed by the method according to the present invention which thus permits the application of the insulation even by unskilled personnel after a very short period of instruction.

The hardeners used in the method and apparatus of the invention are per se known substances which cause a thickening or gelling of alkali silicate. Preferably, the hardener used according to the invention is a solution of an acidically reacting substance or a substance which generates an acidically reacting substance in a chemical reaction. Suitable substances are acidically reacting salts which impart a pH less than 5 to an aqueous solution. It has been found to be especially suitable to use monosodium phosphate and potassium hydrogen sulfate as well as mixtures of these two substances. It is also possible to employ organic substances, for example saponifiable combinations which generate an acidically reacting substance during saponification, for example water-soluble esters, for example diacetin.

Preferably, the monosodium phosphate and/or the potassium hydrogen sulfate are used as solutions containing up to 25 weight % of solid material.

It is further suitable to add to the hardener up to 20 weight % of alcohol, and especially up to 10 weight % and still more preferably between 0.5–10 weight % of a monovalent alcohol, in particular, ethanol. This addition results in being able to apply still thicker layers than are possible with the use of a hardener without alcohol.

The proportion of fibers to binder to hardener is preferably by weight as follows: (10–20): (6–12): (0.5–25).

The mineral fibers used in the composition are suitably those described in the above-mentioned laid-open application OS No. 27 34 839. The additives to the binder described in that publication are also suitable for the present case. As mineral fibers for example glass fibers and rock fibers are mentioned. The additives to the binder can be additives as conventionally used in adhesives on alkali silicate basis, especially alkali metal phosphates like sodium phosphate, or sugars.

In a preferred feature of the invention, the mineral fibers only at the arrival on the subject to be coated are contacted with the binder and the hardener.

An apparatus suitable for carrying out the method of the present invention is a sprayer having a central circular nozzle for spraying the mineral fibers. The central nozzle is surrounded by a concentric array of nozzles for applying the binder. Surrounding these nozzles is a concentric array of nozzles for applying the hardener solution. The various nozzles are connected to pressurized reservoirs by suitable pressure lines while the central nozzle is connected to a blower for applying the fibers.

Further details and characteristics of the apparatus of the invention will emerge from a description of a preferred exemplary embodiment which relates to the drawing.

BRIEF DESCRIPTION OF THE FIGURE

The single FIGURE of the drawing is a front elevational view of a spray head according to the invention.

DESCRIPTION OF THE PREFERRED EMBODIMENT

The spray head according to the invention includes a central circular nozzle 1 for applying mineral fibers. Surrounding the nozzle 1 is a ring of nozzles 2 for applying the binding material. In a second concentric ring are located nozzles 3 for applying the hardener solution.

Advantageously, the nozzle 1 has a diameter of 10 mm-150 mm. The nozzles 2 for applying the binding material preferably have a diameter of more than 1.3 mm, in particular 1.8–2.2 mm. The diameter of the nozzles 3 for applying the hardener is preferably less than 0.9 mm, in particular 0.2–0.4 mm.

All three components are sprayed simultaneously on the object to be protected. This method results in a complete and uniform wetting of fibers with binder and hardener. Preferably, the binder is sprayed under a pressure of more than 4 bar while the hardener is applied under a pressure of more than 2 bar. It has also been found suitable to admix compressed air with the binder within the nozzles 2 of the spray head.

The method according to the invention was carried out by an apparatus according to the invention in an actual example as follows:

A metallic tube having external reinforcement ribs and a diameter of 1 meter was provided with a protective layer of a thickness of 270–300 mm in a single working phase resulting in the application of 1 $m^3$ of insulating compound with the use of an apparatus as shown in the figure. The insulating compound consisted of the following components.

1. 140 kg of rock wool fibers having a fiber length of 5–20 mm;
2. 80 kg of adhesive consisting of:
   90 weight % of a sodium silicate solution having a $Na_2O$ content of 8.1 weight % and a $SiO_2$ content of 27.2 weight %;
   4 weight % of a 5 weight % solution of a low molecular sodium methacrylate (product name Rohagit S hv produced by the firm Röhm); and 6 % of a fine grained kaolin;
3. 10 kg of a 13 weight % solution of monosodium phosphate with 1 weight % ethanol as a hardener.

The insulating layer described above and applied as indicated adhered firmly to the tubular metallic substrate.

The foregoing description relates to merely preferred exemplary embodiments of the features of the invention and other embodiments and variants thereof are possible within the spirit and scope of the invention.

I claim:

1. A method for spray application of a protective coating to an object comprising spraying the coating onto the object, said coating being a mixture of mineral fibers and a binding material consisting of a solution of at least one alkali silicate, at least and at least one water-soluble and alkali-resistant organic polymer, wherein a hardener for hardening said alkali silicate binding material is added to said coating by independently conveying said hardener in the form of a solution to a spray nozzle which independently projects said mixture and said hardener towards the substrate being treated.

2. A method according to claim 1, wherein said hardener is a solution of an acidically reacting substance.

3. A method according to claim 1, wherein said hardener is a solution of a substance which reacts chemically to form an acidically reacting substance.

4. A method according to claim 1, wherein said hardener includes at least one of the substances monosodium phosphate and potassium hydrogen sulfate.

5. A method according to claim 4, wherein said substance is present in a solution of 25 weight %.

6. A method according to claim 1, wherein said hardener includes a quantity of monovalent alcohol.

7. A method according to claim 6, wherein said alcohol is ethanol.

8. A method according to claim 1, wherein the proportion by weight of solids of the substances fibers: binder: hardener is (10–20): (6–12): (0.5–2.5).

9. A method according to claim 1, wherein said mixture is sprayed towards the object being treated by independently conveying said mineral fibers and said binding material to said spray nozzle.

10. A method for spray application of a protective coating to an object comprising spraying the coating onto the object, said coating being a mixture of mineral fibers and a binding material consisting of a solution of at least one alkali silicate, at least one material containing at least 15% by weight kaolinite and at least one water-soluble and alkali-resistant fine-grained silicon dioxide, wherein a hardener for hardening said alkali silicate binding material is added to said coating by independently conveying said hardener in the form of a solution to a spray nozzle which independently projects said mixture and said hardener towards the substrate being treated.

11. A method according to claim 1 or 10, wherein said material containing kaolinite is present in an amount of 1–10 weight % of said binding material.

12. A method according to claim 11, wherein said material containing kaolinite is present in an amount of 2–6 weight % of said binding material.

* * * * *

UNITED STATES PATENT AND TRADEMARK OFFICE

CERTIFICATE OF CORRECTION

PATENT NO. : 4,317,851

DATED : March 2, 1982

INVENTOR(S) : Rudolf P. NESER

It is certified that error appears in the above-identified patent and that said Letters Patent are hereby corrected as shown below:

Claim 1, line 5, after "silicate, at least" insert --one material containing at least 15% by weight kaolinite--

Signed and Sealed this

*Tenth* Day of *May 1983*

[SEAL]

*Attest:*

GERALD J. MOSSINGHOFF

*Attesting Officer* *Commissioner of Patents and Trademarks*